US012597215B2

(12) United States Patent
Leyton et al.

(10) Patent No.: US 12,597,215 B2
(45) Date of Patent: Apr. 7, 2026

(54) REPRESENTING VIRTUAL OBJECTS OUTSIDE OF A DISPLAY SCREEN

(71) Applicant: Sony Interactive Entertainment Europe Limited, London (GB)

(72) Inventors: Pedro Federico Quijada Leyton, London (GB); David Erwan Damien Uberti, London (GB); Lloyd Preston Stemple, London (GB); Aron Giuseppe Visciglia, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 202 days.

(21) Appl. No.: 18/216,868

(22) Filed: Jun. 30, 2023

(65) Prior Publication Data

US 2024/0005613 A1    Jan. 4, 2024

(30) Foreign Application Priority Data

Jun. 30, 2022    (GB) ...................................... 2209619

(51) Int. Cl.
 *G06T 19/00*        (2011.01)
 *G06T 19/20*        (2011.01)
(52) U.S. Cl.
 CPC ............ *G06T 19/006* (2013.01); *G06T 19/20* (2013.01); *G06T 2219/2016* (2013.01)
(58) Field of Classification Search
 CPC ................... G06T 19/006; G06T 19/20; G06T 2219/2016; G06F 3/14; G06F 3/011;
 (Continued)

(56) References Cited

U.S. PATENT DOCUMENTS

2012/0032955 A1    2/2012  Matsuda
2012/0127284 A1*   5/2012  Bar-Zeev .............. G06T 19/006
                                          348/158
(Continued)

FOREIGN PATENT DOCUMENTS

EP        4300268 A1    1/2024

OTHER PUBLICATIONS

UK IPO Combined Search and Examination Report received in Application No. GB2209619.2, date of search Jan. 9, 2023, in 7 pages.

(Continued)

*Primary Examiner* — Chong Wu
(74) *Attorney, Agent, or Firm* — Kilpatrick Townsend & Stockton LLP

(57)        ABSTRACT

A computer-implemented method for representing virtual objects outside of a display screen, comprising: receiving data defining a virtual environment that comprises a plurality of virtual objects, each virtual object having a virtual location within the virtual environment, displaying, on a display screen, a portion of the virtual environment that is within a field of view controlled by a user determining if at least one virtual object of a subset of the virtual objects is outside of the field of view but at least partially within a virtual display area adjacent the display screen. In response to determining that a virtual object of the subset of the virtual objects is at least partially within the virtual display area, the method comprises converting the virtual location of the virtual object into a real-world location, and displaying a virtual element representing the virtual object at the real-world location using a mixed-reality display device.

20 Claims, 5 Drawing Sheets

(58) Field of Classification Search
    CPC ........ G06F 3/04815; G02B 2027/0187; G02B
                27/0172; A63F 13/26; A63F 13/52; A63F
                                                    13/53
    See application file for complete search history.

(56)                    References Cited

U.S. PATENT DOCUMENTS

| | | |
|---|---|---|
| 2013/0290876 A1 | 10/2013 | Anderson et al. |
| 2014/0051510 A1 | 2/2014 | Benko et al. |
| 2015/0348322 A1 | 12/2015 | Ligameri et al. |
| 2018/0034867 A1* | 2/2018 | Zahn ...................... G06F 3/011 |
| 2019/0179406 A1 | 6/2019 | Manda et al. |
| 2020/0228881 A1 | 7/2020 | DeFaria et al. |
| 2020/0241733 A1 | 7/2020 | Drake et al. |
| 2020/0294313 A1* | 9/2020 | Arroyo Palacios ..... A63F 13/25 |

OTHER PUBLICATIONS

Extended European Search Report received in corresponding EP
Application No. 23181390.8, dated Nov. 3, 2023, in 8 pages.

\* cited by examiner

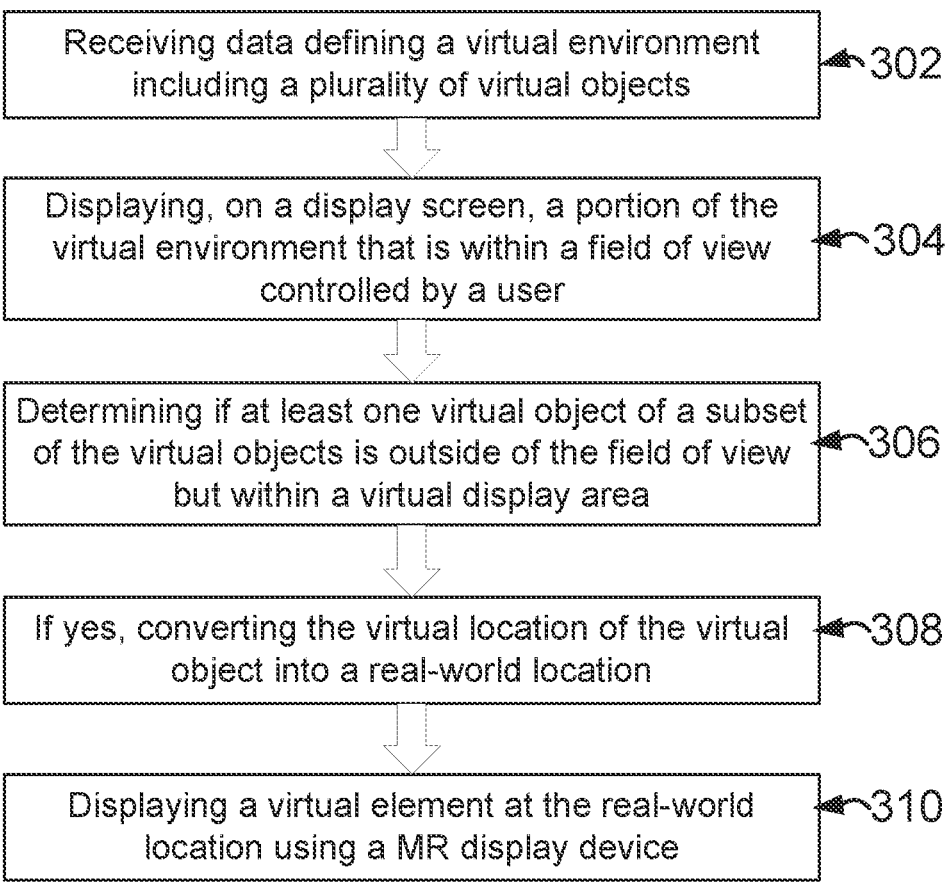

Receiving data defining a virtual environment including a plurality of virtual objects — 302

Displaying, on a display screen, a portion of the virtual environment that is within a field of view controlled by a user — 304

Determining if at least one virtual object of a subset of the virtual objects is outside of the field of view but within a virtual display area — 306

If yes, converting the virtual location of the virtual object into a real-world location — 308

Displaying a virtual element at the real-world location using a MR display device — 310

Fig. 3

REPRESENTING VIRTUAL OBJECTS OUTSIDE OF A DISPLAY SCREEN

CROSS-REFERENCE TO RELATED APPLICATIONS

This application claims priority to United Kingdom Patent Application No. GB2209619.2, filed Jun. 30, 2022, the contents of which are incorporated herein by reference.

FIELD

The present specification relates to a computer-implemented method for representing virtual objects outside of a display screen.

BACKGROUND

The present disclosure relates to virtual environments, such as virtual game worlds. However, virtual environments are not limited to the gaming industry. Indeed, virtual environments are becoming increasingly diverse and are used in many different applications and industries, hosted on a variety of different platforms and services.

In mixed reality, the real world and the virtual world work together to create an augmented reality (or mixed reality) environment. Images are displayed virtually, which may overlap or coincide with the real-world. This can include, for example, displaying virtual objects (e.g., three dimensional interactive images) on tabletops, walls, chairs and floors of the real-world environment. The term augmented reality is often used instead of mixed reality.

SUMMARY

Aspects of the present disclosure are set out in the accompanying independent and dependent claims. Combinations of features from the dependent claims may be combined with features of the independent claims as appropriate and not merely as explicitly set out in the claims.

In a first aspect of the present disclosure, there is provided a computer-implemented method for representing virtual objects outside of a display screen, comprising: receiving data defining a virtual environment, the virtual environment comprising a plurality of virtual objects, each virtual object having a virtual location within the virtual environment, displaying, on a display screen, a portion of the virtual environment that is within a field of view controlled by a user, determining if at least one virtual object of a subset of the plurality of virtual objects is outside of the field of view but at least partially within a virtual display area adjacent the display screen, in response to determining that a virtual object of the subset of the plurality of virtual objects is within the virtual display area, the method comprises converting the virtual location of the virtual object into a real-world location and displaying a virtual element representing the virtual object at the real-world location using a mixed-reality display device.

Thus, in the present disclosure, virtual objects may transition seamlessly from the display screen to the virtual display area as the user moves or re-positions the field of view within the virtual environment. Advantageously, the user is presented with additional information from beyond the boundaries of the field of view of the virtual environment, creating an improved sense of spatial awareness and enhancing the user's experience of (an immersion within) the virtual environment.

Accordingly, the real-world location of each virtual element is within the virtual display area.

The virtual display area may be provided at a fixed location. The virtual display area may be fixed or anchored relative to the physical boundaries of the display screen. As such, the virtual display area may not move if the mixed-reality display device (or user) moves.

The plurality of virtual objects each have a virtual location within the virtual environment, as such they are virtual objects within the virtual environment. The virtual objects are only displayed on the display screen if they are within the field of view of the virtual environment.

It will be appreciated by the skilled person that user interface (UI) elements, heads up display (HUD) elements and other virtual articles do not have a virtual location within the virtual environment. UI, HUD elements etc. are instead displayed on the display screen at a location independent of the field of view of the virtual environment. As such, these elements are not virtual objects within the definition of the present disclosure.

The virtual elements to be displayed within the virtual display area may be displayed by any type of mixed-reality display or extended-reality device.

In some embodiments, only a portion of a virtual object of the subset of virtual objects may be within the virtual display area, for example due to the size or pose of the virtual object in the virtual environment. Thus, the virtual object may be only partially within the virtual display area. Accordingly, the method may comprise converting the virtual location of the portion of the virtual object that is within the virtual display area into a real-world location and displaying a virtual element representing the portion of the virtual object at the real-world location using a mixed-reality display device.

In some embodiments, only virtual objects that are entirely within the virtual display area may be represented by virtual elements. Thus, the method may comprise determining if the virtual object is entirely within a virtual display area adjacent the display screen Optionally, the field of view of the virtual environment may be controlled by the user via a user input device, such as a controller. The field of view may equivalently be referred to as the view frustrum.

Optionally, the field of view corresponds to the field of view of a virtual camera in the virtual environment. The virtual camera may be controlled by the user. In some embodiments, the virtual camera may be referred to as an in-game camera.

Optionally, the display screen and the virtual display area define a visualisation plane.

The method may further comprise scaling a size of the virtual element depending on a distance of the virtual object in the virtual environment along an axis perpendicular to the visualisation plane. Thus, the size of the virtual element may be scaled dependent upon a distance of the virtual object, in the virtual environment, from the virtual camera.

The method may further comprise scaling a size of the virtual element depending on a distance from the user (player) position to the virtual object in the virtual environment. This may depend on the virtual camera perspective (e.g., isometric, 2D, 3D) and experience developer. Optionally, different features or effects can be applied to the virtual element dependent on the distance from the user (player) position to the virtual object, such as scaling, fading, shape morphing, texture adjustment, etc.

Optionally, the virtual element is substantially the same shape as the virtual object.

Optionally, the virtual element is substantially the same colour as the virtual object. In some embodiments, each virtual element may be the same colour independent of the colour of the respective virtual objects. Optionally, the virtual element may have a different transparency or opacity relative to the respective virtual object. One or more of these differences may be advantageous to distinguish the virtual elements from the virtual objects.

The virtual element may be three dimensional (3D) or two dimensional (2D).

Optionally, the virtual element is the same as the virtual object.

Optionally, the virtual element has the same pose as the virtual object.

In some embodiments, the virtual element may have one or more of the same shape, contours, pose, position, colour and/or overall configuration as the virtual object. As such, the virtual element may be a replication or reproduction of the virtual object, as it appears within the virtual environment at the given time.

In other embodiments, the virtual element may be a simplified representation of the virtual object. This may reduce complexity and computational cost.

Optionally, the virtual display area is an extension of the display screen in at least one dimension.

Optionally, the virtual display area may comprise at least a first portion and second portion. The first portion and the second portion of the virtual display area may be arranged adjacent opposing sides, edges or boundaries of the display screen.

Optionally, the virtual display area may comprise a third portion and fourth portion. The third portion and the fourth portion of the virtual display area may be arranged adjacent opposing sides, edges or boundaries of the display screen.

In some embodiments, the first portion of the virtual display area may be arranged adjacent a first boundary (or edge) of the display screen. The second portion of the virtual display area may be arranged adjacent a second boundary (or edge) of the display screen, wherein the second boundary (or edge) is opposite the first boundary (or edge).

In some embodiments, the third portion of the virtual display area may be arranged adjacent a third boundary (or edge) of the display screen. The fourth portion of the virtual display area may be arranged adjacent a fourth boundary (or edge) of the display screen, wherein the third boundary (or edge) is opposite the fourth boundary (or edge). The third and fourth boundaries of the display screen may be substantially perpendicular to the first and second boundaries of the display screen.

Optionally, the virtual display area surrounds, or at least partially surrounds, the display screen.

In some embodiments, one or more virtual boundaries of the virtual display area may be aligned with, or overlap, one or more physical boundaries of the display screen. Optionally, the virtual display area comprises inner virtual boundaries and outer virtual boundaries. The virtual display area is defined by the virtual space between the inner virtual boundaries and the outer virtual boundaries. The inner virtual boundaries may be a virtual representation of the physical boundaries of the display screen.

Optionally, the method further comprises adjusting or selecting at least one of a size or a location of the virtual display area. The adjustment or selection may be carried out by a user.

Optionally, the method further comprises retrieving or receiving data defining at least one of a real-world location, a size and an orientation of the display screen.

4

Optionally, the method further comprises determining at least one of a real-world location, a size and an orientation of the display screen. There are many known methods for determining or detecting this information, which will be known to a person skilled in the art. For example, the method may include using computer vision, artificial intelligence or machine learning to detect the display screen.

Optionally, the virtual location of each virtual object is defined relative to a reference point. The reference point may have a known location on the display screen.

In some embodiments, the reference point may be a predetermined location in the field of view of the virtual environment.

In some embodiments, the virtual location of each virtual object may be defined by the virtual camera (or in-game camera) co-ordinates. The virtual camera (or in-game camera) co-ordinates may be referred to as the world to viewport co-ordinates.

Optionally, the virtual location of each virtual object is a set of two-dimensional or three-dimensional co-ordinates defined relative to the reference point.

It will be appreciated that the display screen is not limited to an electronic display such as a monitor or a TV. In some embodiments, the display screen may be a surface such as a wall or sheet of material that is being used as a projector screen.

Optionally, the display screen has physical (or real-world) boundaries defined relative to the reference point. The virtual display area may comprise virtual boundaries defined relative to the reference point, or relative to the physical (or real-world) boundaries of the display screen.

Optionally, a real-world location and dimensions of the display screen are known and converting the virtual location of the virtual object into the real-world location comprises using the real-world location and dimensions of the display screen to convert the virtual location of the virtual object into a real-world location.

Optionally, the subset of the plurality of virtual objects are selected or predetermined by the user. The method may include selecting or adjusting the subset of the plurality of virtual objects.

In other embodiments, the subset of the plurality of virtual objects are selected or predetermined by the system, or by the developer. The subset of the plurality of virtual objects may not be adjustable by the user.

Optionally, the subset of the plurality of virtual objects comprises one or more types of virtual object. For example, if the virtual environment is a video or computer game, the subset of the plurality of virtual objects may comprise specific groups or types of virtual object within the video or computer game. In some embodiments, the specific groups or types of virtual object may include enemies or opponents, and/or items or rewards such as coins or tokens that are collected by the user in the virtual environment.

Optionally, the virtual environment is a computer game, or a metaverse. The virtual environment may be 2D or 3D.

In a second aspect of the present disclosure, there is provided a system comprising: a display screen, a mixed-reality display device, and a computing device comprising a processor and memory, wherein the computing device, the display screen and the mixed-reality display device are operably connected by a communication network, and wherein the system is arranged and configured to carry out the method of any embodiment or example of the first aspect of the disclosure.

The mixed-reality (MR) display device also comprises a processor and memory.

Optionally, the display screen is an electronic display screen. The display screen may be a TV, or a computer monitor. It will be appreciated that a plurality of display screens may be provided.

Optionally, the mixed-reality display device may be an augmented reality, AR, headset.

BRIEF DESCRIPTION OF THE DRAWINGS

Embodiments of this disclosure will be described hereinafter, by way of example only, with reference to the accompanying drawings in which like reference signs relate to like elements and in which:

FIG. 3 is a flowchart illustrating an embodiment of a computer-implemented method according to the present disclosure;

DETAILED DESCRIPTION

Embodiments of this disclosure are described in the following with reference to the accompanying drawings. It will be appreciated that the drawings are for illustrative purposes only and are not drawn to scale unless otherwise indicated.

Figure 1:
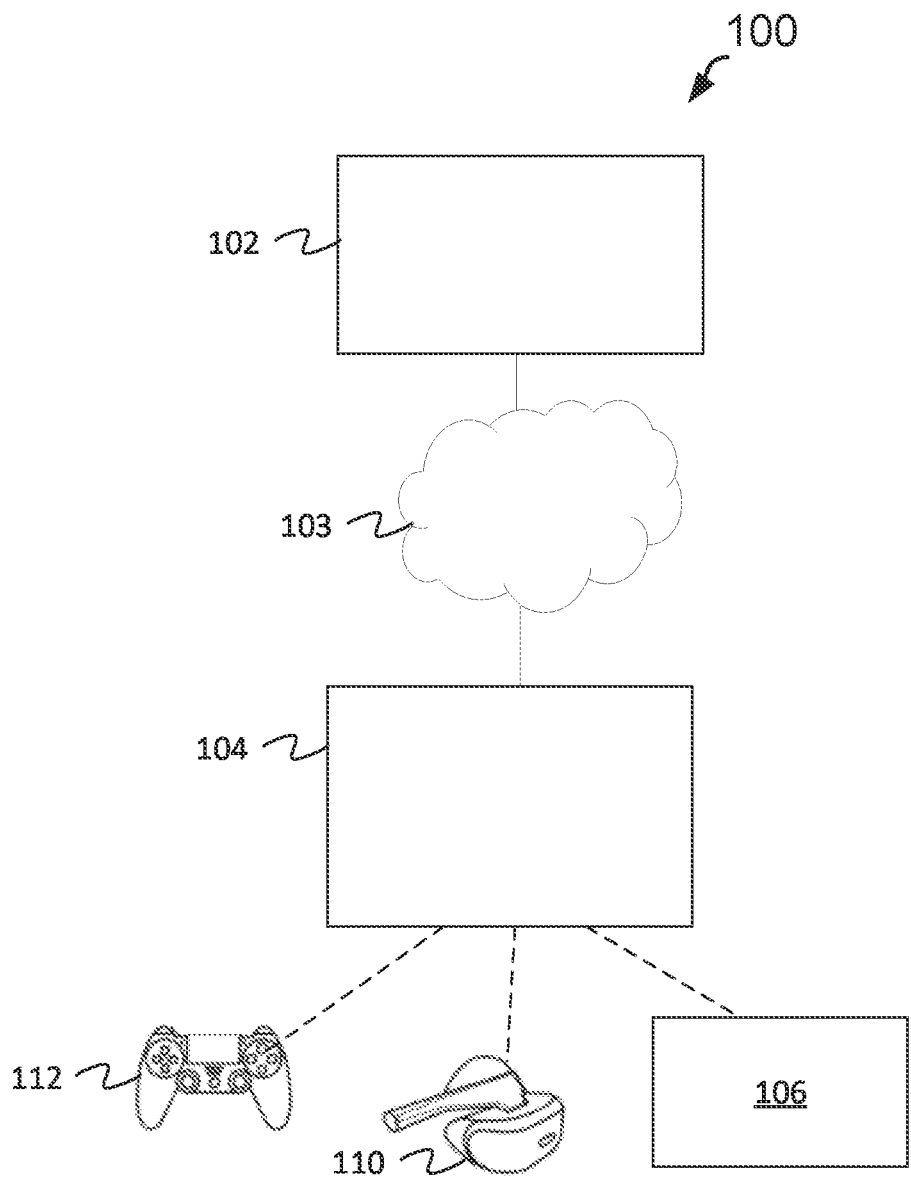
FIG. 1 shows a cloud gaming system according to an embodiment of the present disclosure.

FIG. 1 shows schematically a system 100 in accordance with an embodiment of the present disclosure. In FIG. 1, the system 100 is a cloud gaming system comprising a server 102 that is in communication with a client device 104 via a communications network 103.

The client device 104 may include, but is not limited to, a video game playing device (games console), a smart TV, a set-top box, a smartphone, laptop, personal computer (PC), USB-streaming device, etc. The client device 104 is configured to receive information such as video frames from the server 102, via the communications network 103. The client device 104 may also be referred to in the present disclosure as a computing device.

The client device 104 comprises or is in communication with a display screen 106. The display screen 106 may be in communication with the client device 104 via a wired or wireless connection.

The client device 104 is also in communication with a mixed reality (MR) display device 110. In FIG. 1, the mixed reality display device is shown as a PS VR® headset, but this is not limiting, as it will be appreciated that other types of XR, VR, MR or AR headsets may be used.

In FIG. 1, the client device 104 is also shown as being associated with a user input device 112 (DualShock 4 ®). It will be appreciated that a plurality of input devices and/or a plurality of mixed reality display devices 110 or other electronic devices may be in communication with the client device 104 and/or the mixed reality display device 110. The user input device shown is merely an illustrative example and a different number of, and/or different types of input devices may be provided. The user input device may be in communication with the client device 104 via a wired or wireless connection.

In other embodiments, the system 100 may not comprise the server 102 or the communication network 103. Instead, the client device 104 may comprise memory storing the game or other virtual environment to be displayed on the display screen 106. Alternatively, the client device 104 may receive a non-transitory computer readable medium comprising the information (such as the virtual environment) to be displayed on the display screen 106. Thus, the system 100 of the present disclosure is not limited to a cloud gaming system.

Figure 2:
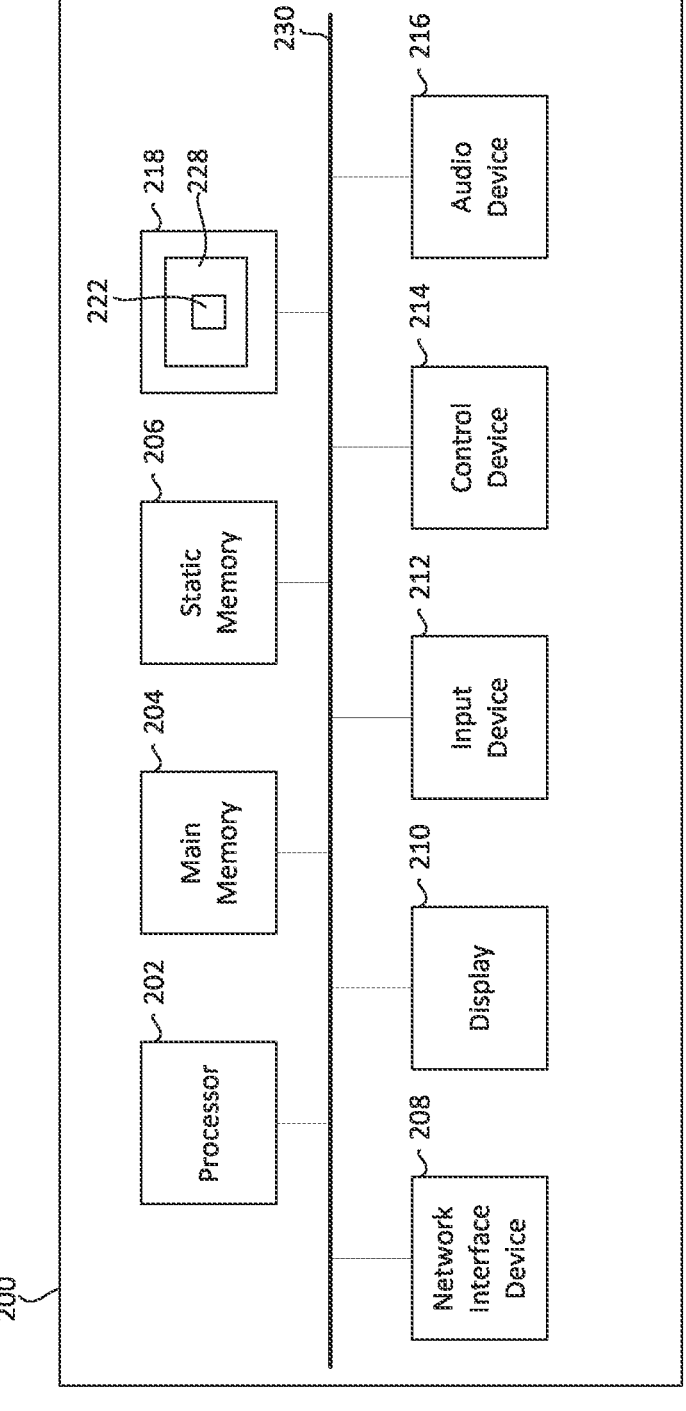
FIG. 2 is a block diagram representing a computing device or mixed reality display device according to an embodiment of this disclosure.

FIG. 2 is a block diagram of one example implementation of a computing device or mixed reality display device 200. The computing device is associated with executable instructions for causing the computing device to perform any one or more of the methodologies discussed herein. The computing device 200 may operate in the capacity of the data model or one or more computing resources for implementing the data model for carrying out the methods of the present disclosure. In alternative implementations, the computing device 200 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 200 includes a processing device 202, a main memory 204 (e.g., read-only memory (ROM), flash memory, dynamic random-access memory (DRAM) such as synchronous DRAM (SDRAM) or Rambus DRAM (RDRAM), etc.), a static memory 206 (e.g., flash memory, static random-access memory (SRAM), etc.), and a secondary memory (e.g., a data storage device 218), which communicate with each other via a bus 230.

Processing device 202 represents one or more general-purpose processors such as a microprocessor, central processing unit, or the like. More particularly, the processing device 202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 202 may also be one or more special-purpose processing devices such as an application specific integrated circuit (ASIC), a field programmable gate array (FPGA), a digital signal processor (DSP), network processor, or the like. Processing device 202 is configured to execute the processing logic (instructions 222) for performing the operations and steps discussed herein.

The computing device 200 may further include a network interface device 208. The computing device 200 also may include a video display unit 210 (e.g., a liquid crystal display (LCD) or a cathode ray tube (CRT)), an alphanumeric input device 712 (e.g., a keyboard or touchscreen), a cursor control device 214 (e.g., a mouse or touchscreen), and an audio device 216 (e.g., a speaker).

The data storage device 218 may include one or more machine-readable storage media (or more specifically one or more non-transitory computer-readable storage media) 228 on which is stored one or more sets of instructions 222 embodying any one or more of the methodologies or functions described herein. The instructions 222 may also reside, completely or at least partially, within the main memory 204 and/or within the processing device 202 during execution thereof by the computer system 200, the main memory 204 and the processing device 202 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hard-wired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilising terms such as "providing", "calculating", "computing," "identifying", "detecting", "establishing", "training", "determining", "storing", "generating", "checking", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 3 is a flowchart of a method according to an embodiment of the present disclosure. At step 302 the method comprises receiving data defining a virtual environment including a plurality of virtual objects. Each virtual object has a virtual location within the virtual environment. The data may include a plurality of video frames.

At step 304 the method comprises displaying, on a display screen, a portion of the virtual environment that is within a field of view that is controlled by a user. The field of view is the view frustrum of a virtual camera in the virtual environment that is controlled by the user, for example via an input device (such as a controller). The virtual camera may be referred to as an in-game camera, although it will be appreciated that in the present disclosure the virtual environment is not limited to computer games.

Accordingly, only the region of the virtual environment that is within the field of view of the virtual camera is displayed on the display screen at any given time. As the user moves around within the virtual environment, or adjusts the position, angle or zoom of the virtual camera, the region of the virtual environment that is within the field of view of the virtual camera will change. As such, virtual objects that are displayed on the display screen at a given time may no longer be displayed on the display screen at a later time.

At any given time, it will be appreciated that there may be one or more virtual objects outside of the field of view (or view frustrum) that will not be displayed on the display screen.

At step 306, the method comprises determining if at least one virtual object of a subset of the virtual objects within the virtual environment is outside of the field of view (or view frustrum) but within a virtual display area. The virtual display area is an area adjacent the display screen.

In some embodiments, the subset of the virtual objects may comprise all of the virtual objects within the virtual environment. However, this could potentially be a very large number of virtual objects, some of which may be of little interest or importance to the user, such as background scenery, etc. Thus, in some embodiments, the subset of the virtual objects may include only specific types of virtual object that may be of higher interest to the user. In some embodiments the subset of the virtual objects may include one or more of (but is not limited to): enemies or opponents; friendly characters or teammates (e.g., in a co-op or multi-player game); or items or rewards (such as coins, loot boxes, etc.). The subset of the virtual objects may be adjusted or defined by the user. In some embodiments, the subset of the virtual objects may be defined by the virtual environment (e.g., by the game developer).

If, at step 306, it is determined that a virtual object of the subset of virtual objects is within the virtual display area (but outside the field of view), then step 308 of the method comprises converting the virtual location of the virtual object into a real-world location. This is described in more detail below in connection with FIGS. 4A and 4B.

When the real-world location of the virtual object has been determined, step 310 of the method comprises displaying a virtual element at the real-world location using a mixed reality (MR) display device. The MR display device may be an AR/VR headset, such as headset 110 in FIG. 1. The virtual element represents the virtual object.

Accordingly, the present disclosure provides a method for representing selected virtual objects that are outside of the field of view of a virtual environment within a virtual display area adjacent to the display screen. In effect, the virtual environment, at least partially, extends beyond the display screen into the virtual display area. This can provide additional information to the user that would otherwise not be viewable, which can improve the user's experience within the virtual environment.

Figure 4A:
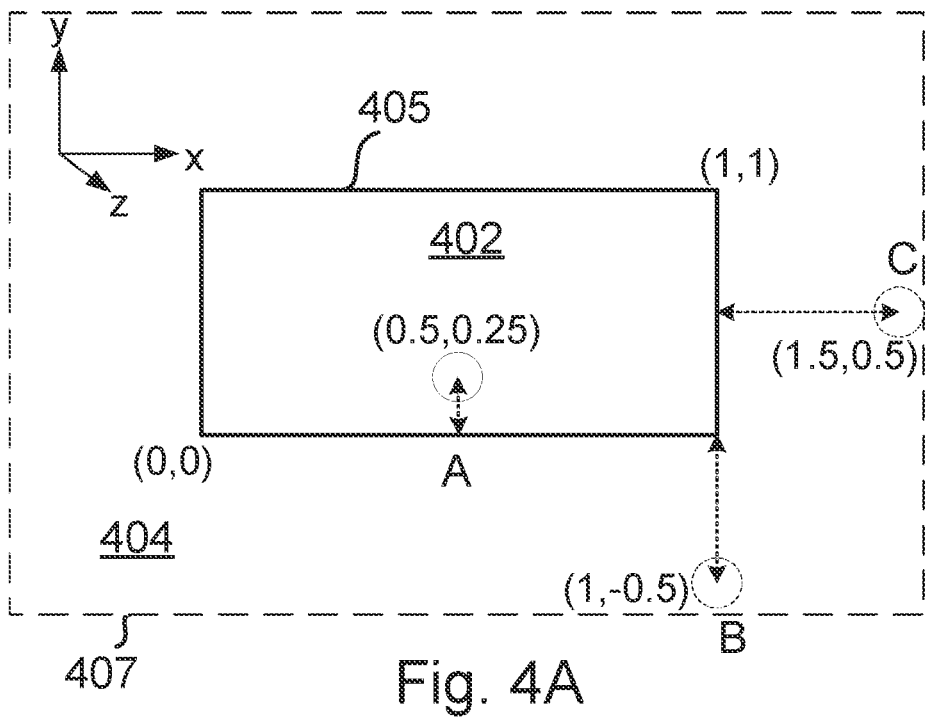
FIG. 4A is a diagram showing how the virtual location of virtual objects within a virtual display area may be converted into real-world locations according to an embodiment of the present disclosure.
Figure 4B:
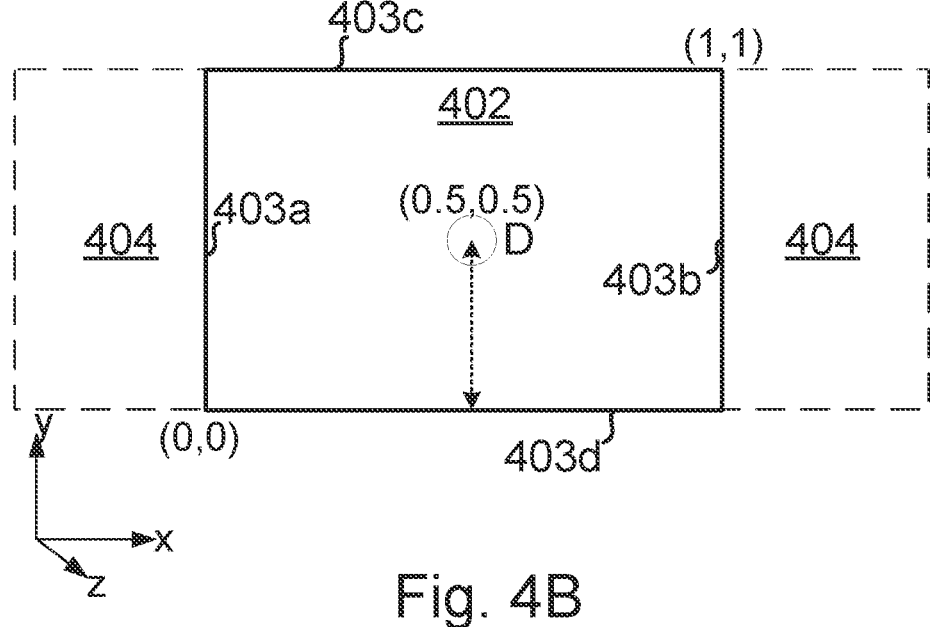
FIG. 4B is a diagram showing how the virtual location of virtual objects within a virtual display area may be converted into real-world locations according to another embodiment of the present disclosure.

It will be appreciated that there may be different methods by which the virtual location of a virtual object may be converted into a real-world location. FIGS. 4A and 4B illustrate one possible method according to the present disclosure.

FIG. 4A shows a display screen 402 that is surrounded by a virtual display area 404. In this embodiment, the virtual display area 404 is adjacent to each boundary of the display screen 402. Thus, the virtual display area 404 is effectively an extension of the display screen 402 in the x and y directions (see FIG. 4A). The virtual display area 404 is fixed relative to the physical boundaries of the display screen 402. Thus, the virtual representation 404 is 'anchored' to the physical display screen 402, such that the virtual display area 404 does not move (relative to the display screen or otherwise) if the extended-reality device moves.

Accordingly, in FIG. 4A the virtual display area 404 comprises outer virtual boundaries 407 and inner virtual boundaries 405. The virtual display area 404 is defined by the space between the inner 405 and outer 407 virtual boundaries. In this embodiment, the inner virtual boundaries 405 are a virtual representation of the physical boundaries of the display screen 402. Thus, the inner virtual boundaries 405 overlap (or are aligned with) the physical boundaries of the display screen 402. The physical boundaries of the display screen 402 may be determined by any known methods, such as using computer vision, artificial intelligence or image tracking to detect the location and orientation of the display screen physical boundaries. The inner virtual boundaries 405 of the virtual display area 404 may then be generated to correspond to the known physical boundaries of the display screen 402. The outer virtual boundaries 407 may be defined relative to the inner virtual boundaries 405.

In this embodiment, the virtual locations of the virtual objects are converted into real-world locations using the virtual camera's (or in-game camera's) world to viewport co-ordinates. The skilled person will appreciate that every virtual object within the virtual environment has a world to viewport co-ordinate and that this can be retrieved from the virtual environment (or is known by the system). The world to viewport co-ordinates are defined relative to the virtual camera. As is standard in this technical field, the world to viewport co-ordinates are represented by a pair of float values (x, y) with (0, 0) defined as the bottom left corner of the virtual camera and (1, 1) defined as the top right of the virtual camera. As such, if a virtual object is within the view frustrum of the virtual camera the values of x and y (in the world to viewport) vary between 0 and 1. Any value of x or y outside of this range indicates that the virtual object is outside of the field of view of the virtual camera and so will not be displayed on the display screen 402. The distance along the z axis of a virtual object from the virtual camera (in the virtual environment) is defined in virtual units (or world units).

As the display screen 402 displays the portion of the virtual environment within the field of view of the virtual camera, it follows that world to viewport (0, 0) also corresponds to the bottom left corner of display screen 402 and world to viewport (1, 1) corresponds to the top right of the display screen 402 (see FIG. 4A). The display screen 402 therefore has a length of x=1 and a height of y=1 in virtual units, so x=1 is one screen width unit and y=1 is one screen height unit. Thus, the virtual location of each virtual object is a set of co-ordinates defined relative to a reference point, wherein the display screen boundaries are defined relative to the reference point.

The co-ordinates shown in FIG. 4A correspond to the world to viewport co-ordinates of three virtual objects, A, B and C. The virtual objects A to C are shown as circles in FIG. 4A, but it will be appreciated that this is for simplicity and is not limiting. The virtual objects A to C may have any shape or configuration.

The first virtual object A has a world to viewport of (0.5, 0.25) which is within the field of view of the virtual camera and so virtual object A is displayed on the display screen 402. The virtual object A has a world to viewport of x=0.5 and y=0.25, which means that virtual object A is located at the midpoint (half-way) along the display screen 402 in the x direction (horizontal axis), and a quarter of the screen height from the bottom of the display screen 402 in the y direction (vertical axis).

In order to determine whether a virtual object is within the virtual display area 404, the dimensions of the virtual display area 404 must be known. The dimensions and location of the virtual display area 404 may, in some embodiments, be set by the user. In FIG. 4A, the virtual display area 404 extends by around 0.5 units in the x and y directions from each boundary of the display screen. As such, the bottom left of the virtual display area 404 may correspond to world to viewport (−0.5, −0.50) and the top right of the virtual display area 404 may correspond to world to viewport (1.5, 1.5). For a virtual object to be within the virtual display area 404 in FIG. 4A x and y (in the world to viewport) but be within the range of −0.5 to 1.5. It will be appreciated that these values are not limiting.

The second virtual object B in FIG. 4A has a world to viewport of (1, −0.5), which means x=1 and y=−0.5. Thus, the second virtual object B is outside of the field of view of the virtual camera, as the value for y is outside of the range of 0 to 1. However, the virtual object B is within the virtual display area 404. From the world to viewport co-ordinates the system of the present disclosure knows that the virtual object B is located at the x=1 vertical boundary of the display screen 402 and 0.5 screen height units below the y=0 boundary of the display screen.

The third virtual object C in FIG. 4A has a world to viewport of (1.5, 0.5), which means x=1.5 and y=0.5. Thus, the second virtual object C is outside of the field of view of the virtual camera, as the value for x is outside of the range of 0 to 1. However, the virtual object C is within the virtual display area 404. From the world to viewport co-ordinates the system of the present disclosure knows that the virtual object C is located 0.5 screen width units from the x=1 vertical boundary of the display screen, and 0.5 screen height units above the y=0 boundary of the display screen.

The locations of the virtual objects B and C can then be converted into real-world locations, if the dimensions and location of the display screen 402 are known. For example, if the system knows the real-world location and orientation of the display screen 402 and that the display screen 402 has a width of, for example, 1 m and a height of 0.5 m, then the virtual location of virtual objects B and C can be converted into real-world locations. For example, if the real-world location of the corner of the display screen 402 corresponding to world to viewport (1, 0) is known, then the real-world location of virtual object B is 0.25 m vertically below this corner of the display screen 402.

FIG. 4B shows another embodiment of the virtual display area 404 according to the present disclosure. In this embodiment, the virtual display area 404 does not completely surround the display screen 402. Instead, the virtual display area 404 is an extension of the display screen 402 in the x direction. The display screen 402 has a first boundary 403a, a second boundary 403b, a third boundary 403c and a fourth boundary 403d. The first boundary 403a is opposite the second boundary 403b and the third boundary 403c is opposite the fourth boundary 403d. The virtual display area 404 comprises a first portion adjacent the first boundary 403a and a second portion adjacent the second boundary 403b. In some embodiments, the virtual display area 404 may be adjacent only one boundary of the display screen (e.g. in FIG. 4B only one portion of the virtual display area 404 may be provided). In other embodiments, the virtual display area 404 may extend adjacent the third and fourth boundaries 403c, 403d. This may depend on the properties (or settings) of the virtual environment, or the real-world environment surrounding the display screen 402. It will be appreciated that the portions 404 of the virtual display area are not necessarily equal in size.

In FIG. 4B a virtual object D has a world to viewport of (0.5, 0.5), which means that the virtual object D is located at the centre of the display screen 402. Thus, the virtual object D is within the field of view of the virtual camera. In FIG. 4B, there are no virtual objects within the virtual display area 404.

Accordingly, in the present disclosure, the virtual display area 404 is aligned with the display screen 402. The location of virtual objects within the display screen 402 and the location of virtual elements within virtual display area 404 are scaled according to the virtual object's positions in the virtual environment, such that there is a seamless transition between the virtual environment on the display screen 402 and in the virtual display area 404.

Figures 5, 6:
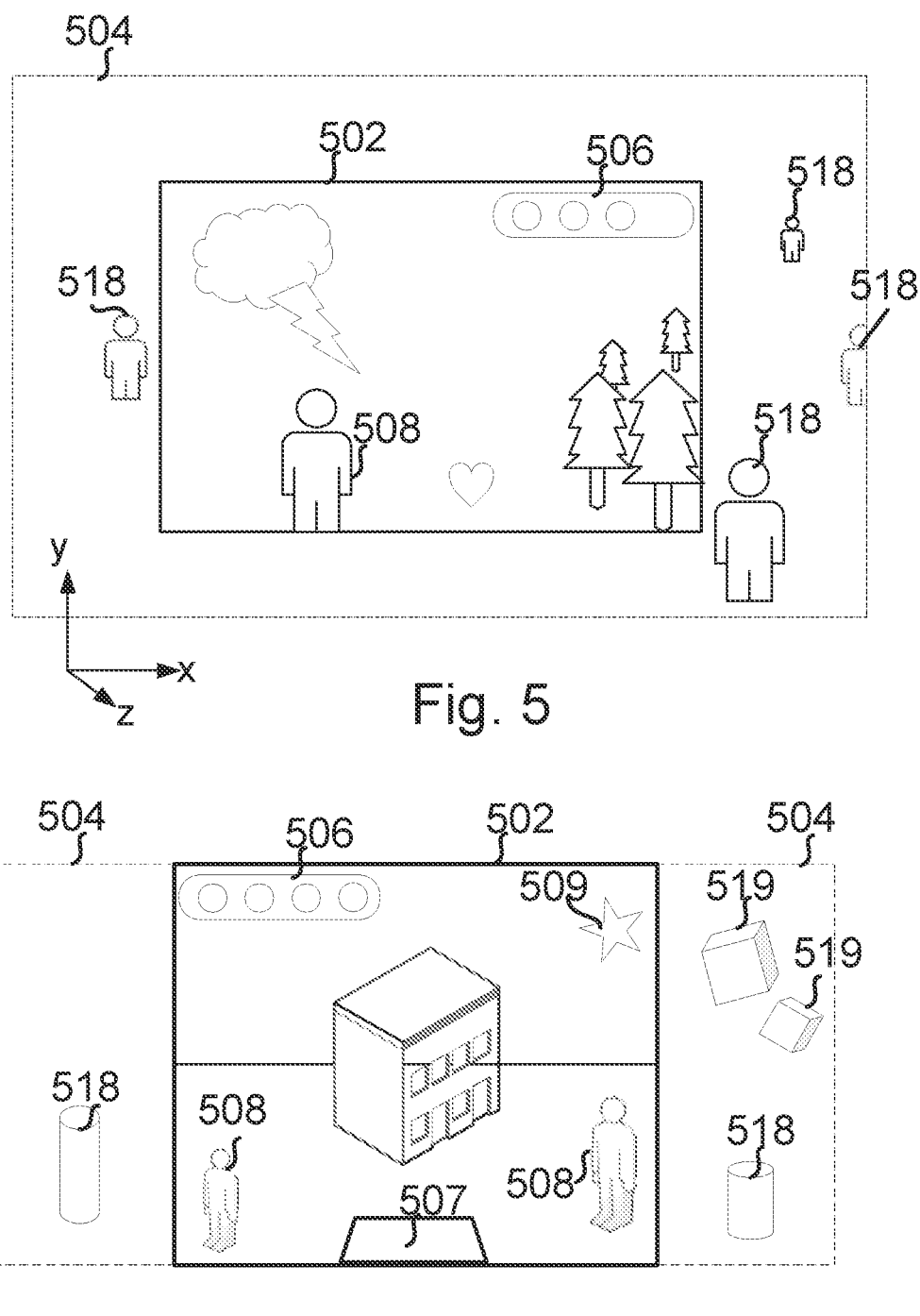
FIG. 5 shows a display screen a virtual display area according to an embodiment of the present disclosure when in use.
FIG. 6 shows a display screen and a virtual display area according to another embodiment of the present disclosure when in use.

FIG. 5 shows an embodiment of a display screen 502 and a virtual display area 504 in use. The virtual display area 504 surrounds the boundaries of the display screen 502 (as in FIG. 4A). The virtual display area 504 does not have any physical boundaries, rather it is a formed of a portion of the wall or other surface adjacent the display screen 502.

The display screen 502 is displaying (or presenting) a portion of a virtual environment that is within a field of view controlled by the user. As shown, the virtual environment includes a plurality of virtual objects, which in this example include trees, a heart, a cloud and lightning strike, and a person 508. It will be appreciated that any virtual objects may be provided. Each of these virtual objects has a respective virtual location within the virtual environment, wherein the location of the virtual objects on the display screen 502 changes when the user changes the field of view (or view frustrum) of the virtual environment.

FIG. 5 also includes a user interface (UI) or heads-up display element 506, which in this non-limiting example, is a health bar indicating the number of lives or amount of health remaining for the user (or the user's avatar) in the virtual environment. The health bar 506 is not a virtual object having a virtual location within the virtual environment, as the health bar 506 is positioned at a fixed location on the display screen 502 independent of the field of view (or in-game camera position).

The person 508 is one of a selected subset of the virtual objects within the virtual environment. For example, the person 508 may be an enemy character, or a friendly character within the virtual environment. As such, it is useful for the user to know the location of these specific virtual objects 508 relative to their field of view of the virtual environment. The type of virtual objects that are selected to form the subset of virtual objects may be predetermined by the virtual environment (or the developers), or they may be selected or adjusted by the user (at least within certain options) depending on their preferences.

In FIG. 5 there are also a plurality of virtual elements 518 within the virtual display area 504. Each of the virtual elements 518 represents a respective one of the subset of virtual objects 508 that is outside of the field of view of the virtual camera, but within the virtual display area 504, at the given location of the virtual element 518. In this embodiment, the virtual elements 518 appear substantially the same shape (and overall appearance) as the virtual objects 508 that they represent. The virtual elements 518 may be a different colour or transparency relative to the virtual objects 508 to distinguish the virtual elements 518 from the virtual objects 508. The virtual elements 518 may also have the same pose as the virtual objects in the virtual environment (although this is very simplified in FIG. 5 it will be appreciated that the pose may be more complex).

In addition, as shown in FIG. 5, the size of the virtual elements 518 is scaled according to the size of the respective virtual object 508 and the distance of the respective virtual object 508 from the user position (or the virtual camera) in the z direction. In some embodiments, the display screen 502 and the virtual display area 504 may define a visualisation plane. The distance of a virtual object from the user position (or virtual camera) in the z direction may be referred to as the distance in the z direction from the visualisation plane. Optionally, different features or effects can be applied to the virtual element 518 dependent on the distance from the user (player) position to the virtual object 508, such as scaling, fading, shape morphing, texture adjustment, etc.

FIG. 5 also shows that, in some embodiments of the present disclosure, only a portion of a virtual object 508 has to be within the virtual display area 504 for a virtual element 518 to be displayed. The virtual element 518' in FIG. 5 represents a portion of a virtual object that is within the virtual display area 504, with the remainder of the virtual object falling outside of the virtual display area 504.

If the user was to adjust the field of view of the virtual environment (e.g., via a controller or other input device) to move (or rotate) the field of view a sufficient distance in the x direction, the person 508 may fall outside of the field of view and no longer be visible on the display screen 502. As such, the person 508 may then be within the virtual display area 504 and be represented by a virtual element 518 at the real-world location that corresponds to the virtual location of virtual object 508. Similarly, one or more of the virtual objects represented by virtual elements 518 in FIG. 5 may, following the virtual camera adjustment, be within the field of view of the virtual camera and so may be presented on the display screen 502. Thus, in the present disclosure, virtual objects may transition seamlessly from the display screen to the virtual display area as the user or changes the field of view within the virtual environment.

In this embodiment, the trees, cloud and other virtual objects currently displayed on the display screen 502, other than person 508, are not within the subset of virtual objects. Accordingly, if one or more of these virtual objects were to fall outside of the field of view of the virtual environment they would not be represented by a virtual element.

Although the virtual environment and virtual elements 518 in FIG. 5 are shown as two dimensional (2D), in some embodiments the virtual environment, virtual objects 508 and/or virtual elements 518 may be three dimensional (3D). In some embodiments, although the virtual objects 508 may be 3D when displayed on the display screen 502, the virtual elements 518 may be 2D to reduce complexity and computational requirements of the system.

FIG. 6 shows another embodiment of a display screen 502 and a virtual display area 504 in use. In this embodiment, the virtual display area 504 extends adjacent the vertical boundaries of the display screen 502, but not above or below the horizontal boundaries of the display screen 502.

In FIG. 6 the display screen 502 is displaying a portion of a 3D virtual environment that is within a field of view controlled by the user. The virtual environment includes a plurality of 3D virtual objects, which in this non-limiting example, includes a building, a star 509, and two people (or avatars) 508. It will be appreciated that any virtual objects may be provided. Each of these virtual objects has a respective virtual location within the virtual environment, wherein the location of the virtual objects on the display screen 502 changes when the user changes the field of view (or view frustrum) of the virtual environment.

FIG. 6 also includes two user interface (UI) or heads-up display (HUD) elements 506 and 507. In this non-limiting example, these two features are a health bar 506, as described in connection with FIG. 5, and a UI menu 507. The health bar 506 and the UI menu 507 are not virtual objects having a respective virtual location within the virtual environment, as the health bar 506 and UI menu 507 are positioned at respective fixed locations on the display screen 502 independent of the field of view (or in-game camera position).

The people 508 and star 509 are part of a subset of the virtual objects within the virtual environment. For example, the subset of virtual objects may include all teammates (friendly characters) and items (e.g., the stars, wherein the items may be collected by the user in the virtual environment). As such, it is useful for the user to know the location of this subset of virtual objects 508, 509 in the virtual environment. The type of virtual objects that are selected to form the subset of virtual objects may be predetermined by the virtual environment (or the developers), or they may be selected or adjusted by the user (at least within certain options or limitations) depending on their preferences.

In FIG. 6 there are also a plurality of virtual elements 518, 519 within the virtual display area 504. Each of the virtual elements 518 represents a respective one of the virtual objects 508 that is outside of the field of view of the virtual camera, but within the virtual display area 504, at the location of the virtual element 518. Each of the virtual elements 519 represents a respective one of the virtual objects 509 that is outside of the field of view of the virtual camera, but within the virtual display area 504, at the location of the virtual element 519.

In this embodiment, each virtual element 518 is a 3D cylinder and each virtual element 519 is a 3D cube. Thus, different virtual elements may be provided to represent different types of virtual object within the subset of virtual objects. In FIG. 6, the virtual elements 518, 519 are not the same shape are the virtual objects 508, 509 that they represent. Instead, the virtual elements 518, 519 are simplified representations of the virtual objects 508, 509, which, although it is less aesthetically pleasing, is more efficient in terms of computing power and time, and can still convey the same information to the user (as long as the user is aware of which virtual object each type of virtual element represents). In some embodiments, it may be preferred to 'disguise' the virtual object by using a virtual element with another shape, for example to not to show that the virtual object is an enemy. In some embodiments, the virtual element maybe more detailed, for example if the virtual object is an enemy the virtual element may display the state of the enemy (agitated, roaming, etc.). In some embodiments, the virtual elements 518, 519 may be 2D, even if the virtual objects 508, 509 are 3D.

Each virtual element 518 519 in FIG. 6 has the same orientation as the respective virtual object in the virtual environment. In addition, the size of the virtual elements 518, 519 may be scaled according to a distance of the respective virtual object from the virtual camera in the z-direction.

In the embodiment shown in FIG. 6, the virtual building is not within the subset of virtual objects, so if the building (or any other virtual object not forming part of the subset) were to fall outside of the field of view of the virtual environment it would not be represented by a virtual element.

If the user was to adjust the field of view of the virtual environment (e.g., via a controller or other input device) in FIG. 6 to translate (or rotate) the field of view upwards in the y direction, then the virtual elements 518, 519 would be translated downwards in the y direction within the virtual display area 504. If the user was to zoom in (on the in-game camera) in the z direction, the field of view would contain a smaller portion of the virtual environment. As such, one or more of the subset of the virtual objects 508, 509 may transition beyond the vertical boundaries of the display screen 502 into the virtual display area 504, where they would be represented by a respective virtual element 518, 519.

Thus, as demonstrated in the present disclosure, virtual objects may transition seamlessly from the display screen to the virtual display area as the user moves the field of view within the virtual environment.

Although some prior art systems combined the use of different virtual areas (or views), they are not positioned to align with another to form a single combined virtual space as in the present disclosure. Through the use of the computer-implemented system and methods described above in the present disclosure, multiple virtual views can become aggregated into a single perspective creating a sense of spatial awareness that appears to go beyond what is visible with the in-game camera (or virtual camera) alone.

Accordingly, there has been described computer-implemented systems and methods for representing virtual objects outside of a display screen, the methods comprising: receiving data defining a virtual environment, the virtual environment comprising a plurality of virtual objects, each virtual object having a virtual location within the virtual environment, displaying, on a display screen, a portion of the virtual environment that is within a field of view controlled by a user determining if at least one virtual object of a subset of the plurality of virtual objects is outside of the field of view but at least partially within a virtual display area adjacent the display screen. In response to determining that a virtual object of the subset of the plurality of virtual objects is at least partially within the virtual display area, the method comprises converting the virtual location of the virtual object into a real-world location, and displaying a virtual element representing the virtual object at the real-world location using a mixed-reality display device.

Although particular embodiments of this disclosure have been described, it will be appreciated that many modifications/additions and/or substitutions may be made within the scope of the claims.

The invention claimed is:

1. A computer-implemented method for representing virtual objects outside of a display screen, comprising:

receiving data defining a virtual environment, the virtual environment comprising a plurality of virtual objects, each virtual object having a virtual location within the virtual environment;

displaying, on a display screen, a portion of the virtual environment that is within a field of view controlled by a user;

determining if at least one virtual object of a subset of the plurality of virtual objects is outside of the field of view but at least partially within a virtual display area adjacent the display screen based on world to viewport co-ordinates of the at least one virtual object;

in response to determining that a virtual object of the subset of the plurality of virtual objects is at least partially within the virtual display area adjacent the display screen, converting the virtual location of the virtual object into a real-world location based on the world to viewport co-ordinates; and displaying a virtual element representing the determined virtual object at the real-world location using a mixed-reality display device.

2. The computer-implemented method of claim 1, wherein the field of view of the virtual environment is controlled by the user via a user input device; and/or wherein the field of view corresponds to the field of view of a virtual camera in the virtual environment, wherein the virtual camera is controlled by the user.

3. The computer-implemented method of claim 1, wherein the display screen and the virtual display area define a visualisation plane, and wherein the method further comprises:

scaling a size of the virtual element depending on a distance of the virtual object in the virtual environment along an axis perpendicular to the visualisation plane.

4. The computer-implemented method of claim 1, wherein:

the virtual element is substantially the same shape as the virtual object; and/or the virtual element is substantially the same colour as the virtual object; and/or the virtual element has a different transparency relative to the virtual object.

5. The computer-implemented method of claim 1, wherein the virtual element is the same as the virtual object or has the same pose as the virtual object.

6. The computer-implemented method of claim 1, wherein the determining comprises (i) obtaining the world to viewport co-ordinates of each of the at least one virtual object, (ii) determining if the world to viewport co-ordinates of each of the at least one virtual object are within a first boundary corresponding to the display screen, and (iii) if world to viewport co-ordinates of a virtual object of the at least one virtual object are not within the first boundary, determining if the world to viewport co-ordinates of the virtual object are within a second boundary corresponding to a virtual display area adjacent the display screen.

7. The computer-implemented method of claim 1, wherein the virtual display area is an extension of the display screen in at least one dimension.

8. The computer-implemented method of claim 1, wherein the virtual display area surrounds, or at least partially surrounds, the display screen.

9. The computer-implemented method of claim 1, further comprising adjusting or selecting, by the user, at least one of a size or a location of the virtual display area.

10. The computer-implemented method of claim 1, further comprising:

retrieving or receiving data defining at least one of a real-world location, a size and an orientation of the display screen; and/or detecting at least one of a real-world location, a size and an orientation of the display screen.

11. The computer-implemented method of claim 1, wherein the virtual location of each virtual object is defined relative to a reference point, the reference point having a known location on the display screen.

12. The computer-implemented method of claim 11, wherein the virtual location of each virtual object is a set of two-dimensional or three-dimensional co-ordinates defined relative to the reference point.

13. The computer-implemented method of claim 12, wherein a real-world location and dimensions of the display screen are known, and converting the virtual location of the virtual object into the real-world location comprises:

using the real-world location and dimensions of the display screen to convert the virtual location of the virtual object into a real-world location.

14. The computer-implemented method of claim 11, wherein the display screen has physical boundaries defined relative to the reference point and wherein the virtual display area comprises virtual boundaries defined relative to the reference point.

15. The computer-implemented method of claim 1, wherein the subset of the plurality of virtual objects are selected or predetermined by the user.

16. The computer-implemented method of claim 1, wherein the subset of the plurality of virtual objects comprises one or more types of virtual object.

17. The computer-implemented method of claim 1, further comprising:

converting the virtual location of the portion of the virtual object into the real-world location in response to determining that only a portion of a virtual object of the subset of the plurality of virtual objects is within the virtual display area.

18. The computer-implemented method of claim 1, wherein the virtual environment is a computer game, or a metaverse.

19. A system comprising:

a display screen;

a mixed-reality display device; and a computing device comprising one or more processors and memory, wherein the computing device, the display screen and the mixed-reality display device are operably connected by a communication network, and wherein the system is arranged and configured to carry out:

receiving data defining a virtual environment, the virtual environment comprising a plurality of virtual objects, each virtual object having a virtual location within the virtual environment;

displaying, on the display screen, a portion of the virtual environment that is within a field of view controlled by a user;

determining if at least one virtual object of a subset of the plurality of virtual objects is outside of the field of view but at least partially within a virtual display area adjacent the display screen based on world to viewport co-ordinates of the at least one virtual object;

in response to determining that a virtual object of the subset of the plurality of virtual objects is at least partially within the virtual display area adjacent the display screen, converting the virtual location of the virtual object into a real-world location based on the world to viewport co-ordinates; and displaying a virtual element representing the determined virtual object at the real-world location using the mixed-reality display device.

20. The system of claim 19, wherein:

the display screen is a TV, or a computer monitor; and/or the mixed-reality display device is an Augmented Reality, AR, headset.

\* \* \* \* \*